United States Patent
Oh et al.

(10) Patent No.: US 9,660,260 B2
(45) Date of Patent: May 23, 2017

(54) CATHODE ACTIVE MATERIAL COATED WITH FLUORINE-DOPED LITHIUM METAL MANGANESE OXIDE AND LITHIUM-ION SECONDARY BATTERY COMPRISING THE SAME

(71) Applicant: KOREA INSTITUTE OF SCIENCE AND TECHNOLOGY, Seoul (KR)

(72) Inventors: Si Hyoung Oh, Seoul (KR); Byung Won Cho, Seoul (KR); Kyung Yoon Chung, Seoul (KR); Hae Ri Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/842,752

(22) Filed: Sep. 1, 2015

(65) Prior Publication Data
US 2016/0329563 A1 Nov. 10, 2016

(30) Foreign Application Priority Data
May 4, 2015 (KR) .................. 10-2015-0062600

(51) Int. Cl.
*H01M 4/36* (2006.01)
*H01M 4/505* (2010.01)
*H01M 4/58* (2010.01)
*H01M 10/052* (2010.01)
*H01M 4/02* (2006.01)

(52) U.S. Cl.
CPC .......... *H01M 4/366* (2013.01); *H01M 4/505* (2013.01); *H01M 4/5825* (2013.01); *H01M 10/052* (2013.01); *H01M 2004/028* (2013.01); *Y02E 60/122* (2013.01)

(58) Field of Classification Search
CPC .... H01M 4/366; H01M 4/5825; H01M 4/505; H01M 10/052; H01M 2004/028; Y02E 60/122

See application file for complete search history.

(56) References Cited

U.S. PATENT DOCUMENTS

| | | | | |
|---|---|---|---|---|
| 2009/0272939 | A1* | 11/2009 | Sun ...................... | H01M 4/366 252/182.1 |
| 2016/0028074 | A1* | 1/2016 | Sugiura ................. | H01M 4/364 429/223 |
| 2016/0028080 | A1* | 1/2016 | Sugiura ................. | H01M 4/366 429/223 |

FOREIGN PATENT DOCUMENTS

| | | |
|---|---|---|
| KR | 10-2006-0109305 A | 10/2006 |
| KR | 1020060133615 A | 12/2006 |
| KR | 1020060023501 A | 4/2008 |
| KR | 1020140095775 A | 8/2014 |
| KR | 10-2014-0129807 A | 11/2014 |

* cited by examiner

Primary Examiner — Laura Weiner
(74) Attorney, Agent, or Firm — Goldilocks Zone IP Law

(57) ABSTRACT

Provided are a cathode active material coated with a fluorine-doped spinel-structured lithium metal manganese oxide, a lithium secondary battery including the same, and a method for preparing the same. The cathode active material has improved chemical stability and provides improved charge/discharge characteristics at elevated temperature (55-60° C.) and high rate. The cathode active material allows lithium ions to pass through the coating layer with ease and is chemically stable, and thus may be used effectively as a cathode active material for a high-power lithium secondary battery.

4 Claims, 4 Drawing Sheets

CATHODE ACTIVE MATERIAL COATED WITH FLUORINE-DOPED LITHIUM METAL MANGANESE OXIDE AND LITHIUM-ION SECONDARY BATTERY COMPRISING THE SAME

CROSS-REFERENCE TO RELATED APPLICATIONS

This application claims priority under 35 U.S.C. §119 to Korean Patent Application No. 10-2015-0062600 filed on May 4, 2015 in the Korean Intellectual Property Office, the disclosure of which is incorporated herein by reference in its entirety.

TECHNICAL FIELD

The following disclosure relates to a cathode active material that is coated with a chemically-stable fluorine-doped spinel-structured lithium metal manganese oxide, provides improved charge/discharge characteristics at elevated temperature and high rate, as well as to a lithium secondary battery including the same.

BACKGROUND

Since lithium secondary batteries were commercialized by Sony Corporation (Japan) in 1992, there has been an increasing demand on lithium secondary batteries along with the development of portable electronic instruments, such as cellular phones, digital cameras, notebook computers, or the like, for about 20 years. Until now, lithium secondary batteries have been used as important power sources for such electronic instruments.

More recently, the application range of lithium secondary batteries has been increased, and thus they have been used not only as power sources for charging small household appliances, such as cleaners or electrically powered tools, but also as medium-capacity batteries developed so as to be applied to electric bicycles or electric scooters.

In addition, lithium secondary batteries have been also used as power sources for electric vehicles, hybrid electric vehicles (HEV), plug-in hybrid electric vehicles (PHEV), various types of robots or medium- or large-scale electric storage systems (ESS). There has been a rapidly increasing demand on such lithium secondary batteries.

Recently, as a cathode active material for such lithium secondary batteries for use in large-scale electric storage systems, a layered lithium nickel manganese cobalt oxide ($LiCo_xNi_yMn_zO_2$) and spinel-structured lithium manganese oxide ($LiMn_2O_4$) have been mostly utilized.

Particularly, a spinel-structured lithium manganese oxide is prepared at low cost and thus has higher cost competitiveness as compared to the other materials. In addition, in spinel-structured lithium manganese oxide, lithium ions can move rapidly via three-dimensionally-interconnected channels, thereby providing excellent high-rate performance. However, in the case of the spinel-structured lithium manganese oxide, unstable $Mn^{3+}$ which has a high-spin $d^4$ electronic configuration, is formed when the cathode is subject to discharge and the average oxidation number of manganese reaches +3.5 or less. As a result, from this, so-called, Jahn-Teller effect, the lithium manganese oxide becomes structurally unstable. Moreover, at elevated temperature, $Mn^{3+}$ may suffer from a dissolution phenomenon ($Mn^{3+} \rightarrow Mn^{4+} + Mn^{2+}$) in which $Mn^{2+}$ produced by a disproportionation reaction or the like is dissolved into an electrolyte, resulting in gradual capacity fading of a lithium secondary battery. In addition, corrosion of manganese may occur due to the hydrofluoric acid (HF) produced by the decomposition of an electrolyte ($LiPF_6$) under high-voltage environment during the charge and discharge, resulting in structural destruction of a cathode. Further, the dissolved manganese ions form a thick solid electrolyte interface (SEI) layer on the negative electrode, thereby increasing impedance and decreasing Coulombic efficiency.

To solve the above-mentioned problems occurring in cathode active materials including a spinel-structured manganese oxide, numbers of literatures report that a lithium manganese oxide material is doped with a small amount of at least one metal species selected from Al, Mg, Ni, Zr, Cr and so on. In this manner, a surface of a high chemical stability is formed and the average oxidation number of manganese is increased so as to inhibit the structural instability caused by formation of $Mn^{3+}$ leading to Jahn-Teller distortion and dissolution of $Mn^{2+}$. Meanwhile, in order to solve the problem of manganese dissolution on the surface, the surface of a lithium manganese oxide material is coated with a corrosion-resistant metal oxide, metal fluoride or metal phosphate in nano-scale. Particularly, various surface modification processes, such as a sol-gel process, spray coating process or fluid suspension coating process, are developed to form a nano-scale layer of a metal oxide, such as $Al_2O_3$, MgO or $ZrO_2$, or $AlF_3$ or $AlPO_4$ on the surface of an electrode or inside an active material with a gradient in its concentration. Those methods are successfully applied commercially.

However, when modifying an active material by using the coating process developed to date according to the related literatures, an electrochemically inactive material is added to the surface of active material so that the capacity thereof is naturally decreased. On the contrary, degradation of capacity or excessive impedance may occur. Particularly, in the case of a sol-gel process, complicated processing steps are required. Therefore, there is a need for a surface treatment process by which desired functions are obtained through more simple processing steps.

REFERENCES

Patent Documents

Korean Laid-Open Patent No. 2006-0109305
Korean Patent Publication No. 0701532
Korean Patent Publication No. 1490406

SUMMARY

An embodiment of the present disclosure is directed to providing a cathode active material that includes a chemically-stable coating layer of fluorine-doped spinel-structured lithium metal manganese oxide, and thus provides improved charge/discharge characteristics at elevated temperature (60° C.) and high rate (7 C).

Another embodiment of the present disclosure is directed to providing a lithium secondary battery including the cathode active material.

In one aspect, there is provided a cathode active material having a core-shell structure, wherein the shell is a coating layer of fluorine-doped spinel-structured lithium metal manganese oxide represented by the following Chemical Formula 1:

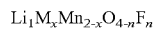  [Chemical Formula 1]

} wherein x is 1/(4−z), z is a common oxidation number (valence number) of M, and n is a real number satisfying 0<n<0.3.

According to an embodiment, the core may be a spinel-structured lithium manganese oxide (LMO).

According to another embodiment, the coating layer of fluorine-doped spinel-structured lithium metal manganese oxide and the core may be used at a weight ratio of 1:20-200.

According to still another embodiment, the coating layer of fluorine-doped spinel-structured lithium metal manganese oxide may have a thickness of 1 nm-1 μm.

In another aspect, there is provided a positive electrode for a lithium ion secondary battery, the positive electrode including the cathode active material.

In still another aspect, there is provided a lithium secondary battery including the cathode active material.

In yet another aspect, there is provided a method for preparing the cathode active material, including the steps of: (A) mixing a lithium precursor, manganese precursor and a metal precursor to form a coating solution for lithium metal manganese oxide; (B) coating a spinel-structured lithium manganese oxide (LMO) with the coating solution; (C) heat treating the coated LMO; and (D) applying fluorine to the surface of the heat treated coating layer of LMO, followed by heat treatment, to carry out doping with fluorine, wherein the coating layer on LMO is a fluorine-doped spinel-structured lithium metal manganese oxide represented by the above Chemical Formula 1.

According to an embodiment, the method may further include, after step (D), carrying out additional heat treatment at 200-700° C.

According to another embodiment, in step (A), the lithium precursor may be at least one selected from $Li_2CO_3$, $LiOH \cdot H_2O$, $LiNO_3$, $LiBO_2$ and a combination thereof; the manganese precursor may be at least one selected from $MnC_2O_4 \cdot 2H_2O$, $MnNO_3 \cdot (H_2O)_4$, $MnCO_3$, $MnO_2$, $Mn(CH_3COO)_2 \cdot 4H_2O$, $Mn_3O_4$, $Mn_2O_3$ and a combination thereof; and the metal precursor may be at least one selected from the above-mentioned lithium precursors, $Al(NO_3)_3 \cdot 9H_2O$, $Al_2O_3$, $B_2O_3$, $B(OC_2H_5)_4$, $H_3BO_3$, $GaO$, $MgCrO$, $MgTiO$, $CaAlO$, $ZnSO_4 \cdot 7H_2O$, $ZnO$, $NiTiO$, $NiCrO$ and a combination thereof.

In step (D), the fluorine compound may be selected from ammonium fluoride ($NH_4F$), ammonium difluoride ($NH_4HF_2$) and a combination thereof.

The lithium metal manganese oxide and LMO may be used at a weight ratio of 1:20-100.

The cathode active material disclosed herein includes a coating layer of lithium metal manganese oxide having an oxidation number close to +4 and thus is chemically stable. In addition, an epitaxial interface is formed between the core and the coating layer, thereby providing the coating layer with structural and mechanical stability against volume change. Further, oxygen atoms in the $MnO_6$ regular octahedron of the coating layer are partially substituted with fluorine atoms so that the effect of Jahn-Teller distortion is reduced, thereby enhancing the structural stability of the material itself.

In addition, the coating layer of the cathode active material disclosed herein inhibits the capacity fading of active material, decreases dissolution of manganese into an electrolyte, improves electrochemical cycle performance at elevated temperature, and provides improved high-rate charge/discharge characteristics by virtue of high lithium ion mobility in the coating layer. Further, the coating layer serves to reduce the direct contact area between LMO and an electrolyte, and thus protects the cathode active material from the electrolyte and inhibits side reactions caused by the decomposition of electrolyte.

Therefore, the cathode active material disclosed herein can be applied effectively as a cathode material for high-performance lithium secondary batteries, such as those for use in electric vehicles or medium- or large-scale electric storage systems, and can be obtained with ease at low cost through a simple surface treatment process.

DETAILED DESCRIPTION OF EMBODIMENTS

Figure 1:
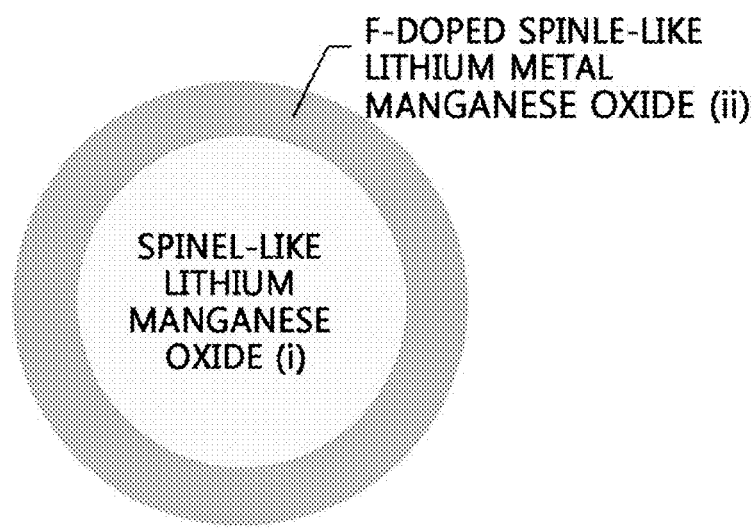
FIG. 1 is a schematic view illustrating a cathode active material having a core-shell structure according to an embodiment, the cathode active material including a lithium metal oxide (core) coated with a fluorine-doped spinel-structured lithium metal manganese oxide (shell).

The present disclosure relates to a cathode active material including a chemically-stable coating layer of fluorine-doped spinel-structured lithium metal manganese oxide, wherein the cathode active material is capable of improving charge/discharge characteristics at elevated temperature (55-60° C.) and high rate, allows lithium ions to pass through the coating layer with ease. The present disclosure also relates to a lithium secondary battery including the cathode active material and a method for preparing the cathode active material.

As used herein, the term 'doping' means adding a desired atom into the structure to make a complete solid solution and 'coating' means applying a material onto the top surface of a substrate to form a layer.

Hereinafter, the present disclosure will be explained in more detail.

In one aspect, there is provided a cathode active material having a core-shell structure including a core and a shell surrounding the surface and coated thereon, wherein the core is a spinel-structured lithium manganese oxide ($LiM_pMn_{2-p}O_4$, also referred to as 'LMO' hereinafter), and the shell is a fluorine-doped spinel-structured lithium metal manganese oxide represented by the following Chemical Formula 1:

$$Li_1M_xMn_{2-x}O_{4-n}F_n \qquad \text{[Chemical Formula 1]}$$

wherein x is 1/(4−z), z is an oxidation number of M, and n is a real number satisfying 0<n<0.3.

In the cathode active material including a spinel-structured LMO (core) coated with a coating layer (shell) of fluorine-doped spinel-structured lithium metal manganese oxide, manganese in the coating layer has an oxidation number close to +4 and thus is chemically stable. In addition, by virtue of such a high oxidation number of manganese in the coating layer, the electrochemical capacity occurring in the coating layer is trivial and there is little structural change and stress developed by charge/discharge process.

Further, since the coating layer has the same spinel structure as the internal spinel-structured LMO, diffusion of lithium ions proceeds efficiently, resulting in improvement of the performance of a lithium secondary battery at high current rate(high power).

In the cathode active material according to the present disclosure, oxygen atoms in the $MnO_6$ regular octahedron of the coating layer are partially substituted with fluorine atoms and the initial octahedral symmetry ($O_h$) is broken. Due to this, a 'so-called' Jahn-Teller distortion phenomenon is reduced and the coating layer protects the core, thereby enhancing structural stability. Since fluorine has higher electronegativity than oxygen, fluorine doping generally increases the binding force between fluorine and manganese, as well as between fluorine and metal (M), and thus improves the corrosion-resistance of cathode active material under a caustic environment.

The coating layer (shell) of fluorine-doped spinel-structured lithium metal manganese oxide has fluorine doped at the oxygen sites of the compound represented by the following Chemical Formula 2, and thus forms a coating layer of fluorine-doped spinel-structured lithium metal manganese oxide represented by the above Chemical Formula 1:

$$Li_1M_xMn_{2-x}O_4 \quad \text{[Chemical Formula 2]}$$

wherein x is 1/(4−z), and z is an oxidation number of M.

In Chemical Formula 1 and Chemical Formula 2, M is a metal selected from the group consisting of Al, B, Ga, Mg, Ca, Zn, Ni, Li and a combination thereof. For example, when M is Al, B or Ga, it has an oxidation number of 3 and thus x is 1; when M is Mg, Ca, Zn or Ni, it has an oxidation number of 2 and thus x is 0.5; and when M is Li, it has an oxidation number of 1 and thus x is ⅓. Particularly, the coating layer represented by Chemical Formula 1 may include $LiAlMnO_{4-n}F_n$, $LiGaMnO_{4-n}F_n$, $LiMg_{0.5}Mn_{1.5}O_{4-n}F_n$, $LiZn_{0.5}Mn_{1.5}O_{4-n}F_n$, $LiBMnO_{4-n}F_n$, $LiCa_{0.5}Mn_{1.5}O_{4-n}F_n$, $LiNi_{0.5}Mn_{1.5}O_{4-n}F_n$, $LiLi_{0.33}Mn_{1.67}O_{4-n}F_n$, or the like, but is not limited thereto.

In addition, x means the amount of the other metal with which manganese is substituted, and is determined by the oxidation number (z) of the metal (M) for substitution. It is preferred to set the amount of metal (M) so that the oxidation number of manganese may be close to +4.

In Chemical Formula 1, n is a real number satisfying 0<n<0.3. As the oxidation number of manganese in the coating layer approaches +4, the cathode active material becomes more stable. Otherwise, the cathode active material may experience instability from the formation of Jahn-Teller cation $Mn^{3+}$ or dissolution and become structurally or chemically unstable. Thus, It is preferred that the value of n satisfies the above-defined range.

The cathode active material according to the present disclosure may have optimized chemical and structural stability. To prevent generation of impurities, the coating layer of lithium metal manganese oxide and spinel-structured LMO (core) may be mixed at a weight ratio of 1:20-200, particularly 1:20-100. When the weight ratio of the spinel-structured LMO (core) is less than the above-defined lower limit based on the coating layer (shell) of lithium metal manganese oxide, it is not possible to provide a sufficient effect of improving the electrochemical performance of a cathode active material through the use of the cathode active material, and the surface coating material may diffuse into the core so that the core material may be doped. On the other hand, when the weight ratio of the spinel-structured LMO is more than the above-defined upper limit, the amount of electrochemically inactive material (coating layer) is increased, resulting in decrease of the overall capacity of the active material.

In addition, to prevent generation of impurities, in step (D) of the above-mentioned method, the fluorine compound and the spinel-structured LMO coated with a lithium metal manganese oxide are mixed with each other at a weight ratio of 1:50-100,000, particularly 1:50-1,000. When the weight ratio of the spinel-structured LMO coated with a lithium metal manganese oxide based on the fluorine compound is less than the above-defined lower limit, the amount of fluorine doping on the surface is not sufficient, and thus it is not possible to effectively improve the chemical and structural stability through the doping. When the weight ratio of the spinel-structured LMP coated with a lithium metal manganese oxide is more than the above-defined upper limit, an impurity phase is formed, resulting in undesired degradation of electrochemical characteristics.

As shown in FIG. 1, the cathode active material according to the present disclosure includes: (i) a spinel-structured lithium manganese oxide (LMO) (core); and (ii) a coating layer (shell) formed on the top surface of the spinel-structured LMO to a thickness of 1 nm-1 μm. When the coating layer has a thickness less than the above-defined lower limit, chemical and structural stability may be degraded. When the coating layer has a thickness larger than the above-defined upper limit, the amount of electrochemically inactive materials is increased, resulting in degradation of the overall capacity of the active material.

In addition, in the cathode active material according to the present disclosure, manganese oxide in the coating layer has an oxidation number close to +4, and thus the chemical and structural stability at the interface between the active material and electrolyte is improved. Also, since both the spinel-structured LMO (core) and the coating layer (shell) have a spinel structure, lithium diffusion proceeds efficiently while lithium ions move. Further, structural and mechanical stability is improved.

In another aspect, there is provided a method for preparing a cathode active material coated with a fluorine-doped spinel-structured lithium metal manganese oxide.

The method for preparing a cathode active material according to the present disclosure includes the steps of: (A) mixing a lithium precursor, manganese precursor and a metal precursor to form a coating solution of lithium metal manganese oxide; (B) coating a spinel-structured lithium manganese oxide (LMO) with the coating solution; (C) heat treating the coated LMO; and (D) applying fluorine sources to the surface of the heat treated coating layer of LMO, followed by heat treatment. The method provides a cathode active material, i.e., a spinel-structured lithium manganese oxide (LMO) coated with a coating layer of fluorine-doped spinel-structured lithium metal manganese oxide represented by the above Chemical Formula 1.

First, in step (A), a lithium precursor, manganese precursor and metal precursor are mixed to provide a coating solution of lithium metal manganese oxide.

The lithium precursor may be at least one selected from $Li_2CO_3$, $LiOH·H_2O$, $LiNO_3$, $LiBO_2$ and a combination thereof; the manganese precursor may be at least one selected from $MnC_2O_4 \cdot 2H_2O$, $MnNO_3 \cdot (H_2O)_4$, $MnCO_3$, $MnO_2$, $Mn(CH_3COO)_2 \cdot 4H_2O$, $Mn_3O_4$, $Mn_2O_3$ and a combination thereof; and the metal precursor may be at least one selected from $Al(NO_3)_3 \cdot 9H_2O$, $Al_2O_3$, $B_2O_3$, $B(OC_2H_5)_4$, $H_3BO_3$, GaO, MgCrO, MgTiO, CaAlO, $ZnSO4 \cdot 7H_2O$, ZnO, NiTiO, NiCrO and a combination thereof.

Next, in step (B), the spinel-structured LMO is coated with the coating solution through a wet process.

A wet coating process, such as a sol-gel process or spraying process, is preferred for the coating in order to obtain good reproducibility and efficient coating. When the coating is carried out through a process other than a wet coating process (such as a dry ball milling process), the lithium metal manganese oxide may not be distributed homogeneously on the top surface of spinel-structured lithium LMO, and a structural defect may be generated during the subsequent fluorine doping step.

Then, in step (C), the coated LMO is heat treated at 300-700° C., particularly 400-600° C., for 1-24 hours, particularly 6-12 hours.

When the heat treatment is carried out according to the above-defined condition, crystals are formed adequately on the surface of the lithium metal manganese oxide particles and a coating layer having lithium ion conductivity can be formed, contrary to the heat treatment under the condition beyond the above-defined ranges. Particularly, it is possible to form a gradient in the composition of the compound represented by Chemical Formula 2 between the portion close to the surface of the coating layer and the portion close to the core portion by controlling the heat treatment temperature and time during the heat treatment for forming the coating layer of spinel-structured lithium metal manganese oxide so that the diffusion between the coating layer and the core material may be controlled. It is also possible to obtain a cathode active material having a structure including the coating layer and core connected smoothly with each other by controlling the heat treatment time and temperature.

By virtue of the above-mentioned characteristics, it is possible to reduce the mechanical stress inside the particles that may be caused by the coating layer using a material different from the core material, and to improve the structural and mechanical stability.

After that, in step (D), a fluorine compound is applied to the surface of the heat treated LMO and primary heat treatment is carried out at 200-400° C., particularly 200-300° C., for 5-180 minutes, particularly 30-150 minutes, thereby carrying out doping of the lithium metal manganese oxide (coating layer) with fluorine sources.

The primary heat treatment carried out after the application of the fluorine compound generates hydrogen fluoride (HF) gas from the fluorine compound, and the hydrogen fluoride gas is in contact with the lithium metal manganese oxide so that the oxygen atoms present at the exterior portion (portion to which the fluorine compound is applied) may be substituted with fluorine atoms to provide a coating layer of lithium metal manganese oxide having a fluorine-doped exterior portion.

The fluorine compound may be at least one selected from ammonium fluoride ($NH_4F$), ammonium difluoride ($NH_4HF_2$) and a combination thereof, particularly may be ammonium fluoride. For example, ammonium fluoride ($NH_4F$) undergoes reversible decomposition into ammonia ($NH_3$) and hydrogen fluoride (HF) gases at a temperature of 100° C. or higher ($NH_4F(s) \rightarrow NH_3(g) + HF(g)$), wherein the generated hydrogen fluoride gas reacts with the surface of the lithium metal manganese oxide so that the oxygen atoms of the lithium metal manganese oxide may be partially substituted with fluorine atoms.

The primary heat treatment provides a time and condition sufficient to carry out reaction between the hydrogen fluoride gas generated from the decomposition of the fluorine compound and the surface of the lithium metal manganese oxide. When controlling the time or temperature during the contact between the hydrogen fluoride gas and the lithium metal manganese oxide, it is possible to control the thickness of the fluorine-doped coating layer on the lithium metal manganese oxide or to form a gradient in concentration of fluorine between the portion close to the surface of the coating layer and the portion close to the core.

In addition, after step (D), the method may further include secondary heat treatment carried out at 200-700° C., particularly 500-700° C., for 1-12 hours, particularly 1-6 hours.

By virtue of the secondary heat treatment, it is possible to remove the remaining unreacted fluorine compound. It is also possible to adjust the thickness of the coating layer by allowing diffusion of fluorine atoms affluent on the surface of the cathode active material or to form a layer having a gradient in fluorine concentration inside the coating layer.

The cathode active material according to the present disclosure may be added to an organic solvent, such as N-methyl-2-pyrrolidone, together with a binder, such as polyvinylidene fluoride or polyvinylidone, and a conductive agent, such as Denka Black, acetylene black or carbon black, to obtain a cathode active material slurry composition. Then, the slurry composition is applied to a current collector, such as aluminum foil, by using a doctor blade, followed by drying (for example, in a vacuum oven at 80° C.). In this manner, a cathode for a lithium ion battery is provided. As an anode, lithium metal or Li-intercalating carbonaceous material may be used. Then, a separator is interposed between the cathode and the anode to form an electrode assembly, which, in turn, is inserted into a battery casing, such as a stainless steel or aluminum pouch or casing. Finally, an electrolyte is injected thereto, followed by sealing. In this manner, it is possible to obtain a lithium secondary battery.

The examples and experiments will now be described. The following examples and experiments are for illustrative purposes only and not intended to limit the scope of this disclosure. In addition, it will be apparent to those skilled in the art that various changes and modifications may be made without departing from the spirit and scope of the disclosure as defined in the following claims.

Examples 1-2

Preparation of $LiAl_{0.1}Mn_{1.9}O_4$ Coated with $LiAlMnO_{4-n}F_n$

A coating solution of $LAlMnO_4$ ($Li_1M_xMn_{2-x}O_4$ wherein M=Al, z=+3, x=1) is used to obtain a coated lithium manganese oxide (LMO). For this, $Li(CH_3COO)$, $Al(NO_3)_3 \cdot 9H_2O$ and $Mn(CH_3COO)_2 \cdot 4H_2O$ are used, and then the starting materials are mixed in such a manner that the molar ratio of Li:Al:Mn present in the materials is 1:1:1 and dissolved into ethanol to obtain a coating solution of $LiAlMnO_4$.

Then, spinel-structured $LiAl_{0.1}Mn_{1.9}O_4$ (obtained according to the following Comparative Example 1, LMO) is added to the coating solution in such a manner that the weight ratio of the coating solution of $LiAlMnO_4$:LMO is 1:50. After that, the resultant mixture is agitated thoroughly by using an ultrasonic mixer (Ultrasonic Cleaner, Bransonic) to form homogeneous slurry, which, in turn, is dried completely in an oven at 60° C. Then, the obtained LMO coated with the coating solution is heat treated at 400° C. for 6 hours to obtain a LMO coated with spinel-structured $LiAlMnO_4$.

After the coating, the LMO coated with spinel-structured $LiAlMnO_4$ is mixed homogeneously with ammonium fluoride at a weight ratio of 100:1 and the resultant mixture is introduced to an air-tight container to carry out primary heat treatment at 200° C. for 2 hours. Then, heat treatment is further carried out at 500° C. for 6 hours (Example 1) or at 700° C. for 6 hours (Example 2) in order to increase the coating layer thickness of the particles subjected to the primary heat treatment. In this manner, a cathode active material that is a spinel-structured LMO having a coating layer of fluorine-doped lithium aluminum manganese oxide ($LiAlMnO_{4-n}F_n$) is obtained.

Comparative Example 1

Preparation of $LiAl_{0.1}Mn_{1.9}O_4$ Having No Coating Layer $Li_2CO_3$, $Mn_3O_4$, and $Al(NO_3)_3 \cdot 9H_2O$ are used and mixed in such a manner that the molar ratio of Li:Al:Mn present in the materials is 1:0.1:1.9, and then the resultant mixture is introduced to a ball mill container (500 mL). Next, balls having a diameter of 10 mm/5 mm are introduced thereto in such a manner that the BRP (Ball to Powder Ratio) is about 6 and mechanical milling is carried out under 200 rpm for 2 hours.

After the milling, the powder is recovered and introduced into a ceramic boat. Then, heat treatment is carried out in a box furnace under atmospheric environment at 800° C. for 12 hours, and heat treatment is further carried out at 600° C. for 6 hours to obtain $LiAl_{0.1}Mn_{1.9}O_4$ having no coating layer.

Comparative Example 2

Preparation of $LiAl_{0.1}Mn_{1.9}O_4$ Coated with Non-Fluorine Doped $LiAlMnO_4$ A coating solution of $LAlMnO_4$ is used to obtain a coated lithium manganese oxide (LMO). For this, $Li(CH_3COO)$, $Al(NO_3)_3 \cdot 9H_2O$ and $Mn(CH_3COO)_2 \cdot 4H_2O$ are used, and then the starting materials are mixed in such a manner that the molar ratio of Li:Al:Mn present in the materials is 1:1:1 and dissolved into ethanol to obtain a coating solution of $LiAlMnO_4$. Then, spinel-structured $LiAl_{0.1}Mn_{1.9}O_4$ (obtained according to the following Comparative Example 1, LMO) is added to the coating solution in such a manner that the weight ratio of the coating solution of $LiAlMnO_4$:LMO is 1:50. After that, the resultant mixture is agitated thoroughly by using an ultrasonic mixer (Ultrasonic Cleaner, Bransonic) to form homogeneous slurry, which, in turn, is dried completely in an oven at 60° C. Then, the obtained LMO coated with the coating solution is heat treated at 400° C. for 6 hours to obtain a LMO coated with spinel-structured $LiAlMnO_4$.

TEST EXAMPLES

Test Example 1. X-Ray Diffractometry

Figure 2:
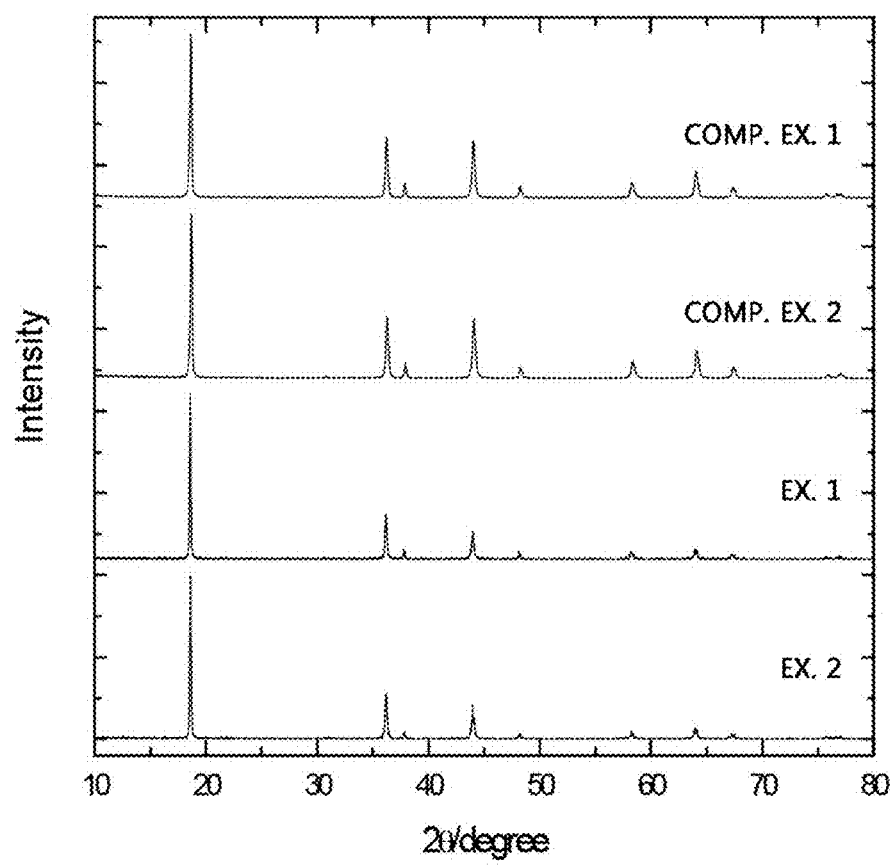
FIG. 2 is a graph illustrating the cathode active materials according to the inventive Examples and Comparative Examples as determined by X-ray diffractometry (XRD).

FIG. 2 is a graph illustrating the cathode active materials according to Examples 1 and 2 and Comparative Examples 1 and 2 as determined by X-ray diffractometry (XRD).

As shown in FIG. 2, when comparing fluorine-doped Example 1 and 2 with Comparative Example 2 having no fluorine doping, a pure spinel phase (space group Fd-3m) having no impurities is formed before and after fluorine doping.

Test Example 2. Scanning Electron Microscopy

Figure 3:
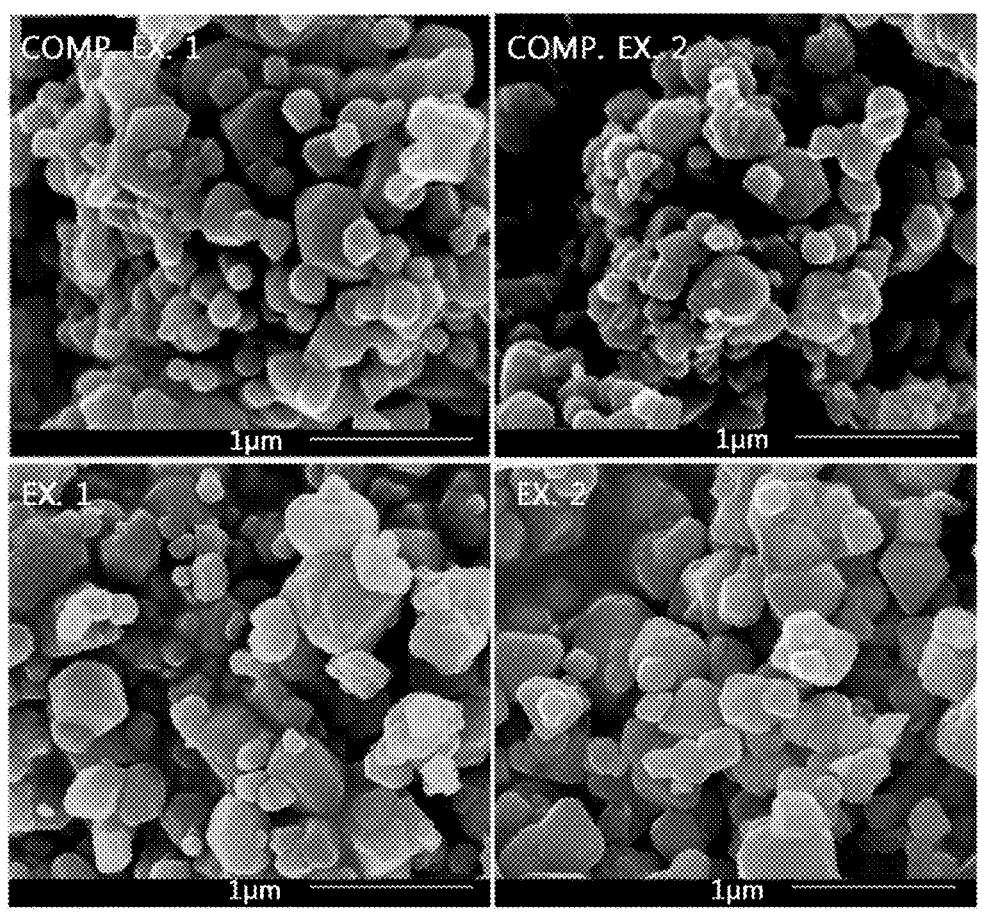
FIG. 3 shows the photographs of the cathode active materials according to the inventive Examples and Comparative Examples, taken by scanning electron microscopy (SEM).

FIG. 3 shows the photographs of the cathode active materials according to Examples 1 and 2 and Comparative Example 1, taken by scanning electron microscopy (SEM).

As shown in FIG. 3, when comparing the surface shape of spinel-structured LMO before forming the coating layer with the surface shape thereof after forming the coating layer, Examples 1 and 2 and Comparative Example 1 show little change in particle shape. This suggests that forming the coating layer does not cause any significant structural change in particle shape.

Test Example 3. Test for Electrochemical Characteristics

To determine the electrochemical performance of each of the cathode active materials obtained according to Examples and Comparative Examples, a cathode is fabricated and 2032 Coin Cell (Hosen Co., Ltd.) is used to form a half cell and the performance thereof is evaluated.

First, to form a cathode, each of the cathode active materials according to Examples and Comparative Examples, Denka Black (Denka Electrochemicals) as a conductive agent and polyvinylidene fluoride (Sigma-Aldrich) as a binder are mixed at a weight ratio of 85:10:5. Next, the resultant mixture is dispersed and mixed homogeneously in a predetermined amount of N-methyl-2-pyrrolidone (Sigma-Aldrich) to form slurry. The resultant slurry is coated onto aluminum foil by using a doctor blade and dried in a vacuum oven at 80° C. to obtain a cathode.

Figure 4:
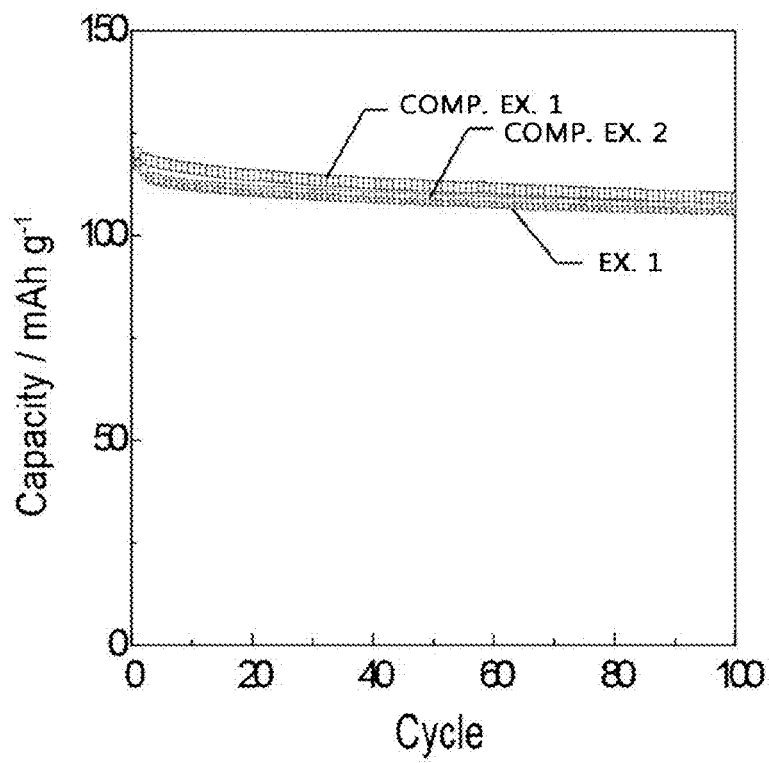
FIG. 4 is a graph illustrating the cycle performance of the half-cells obtained by using the cathode active materials according to the inventive Examples and Comparative Examples.

FIG. 4 is a graph illustrating the cycle performance of the half-cells obtained by using the cathode active materials according to Example 1 and Comparative Examples 1 and 2.

As shown in FIG. 4, when charge/discharge cycles are carried out 100 times at a current density of 1 C, Comparative Example 1, Comparative Example 2 and Example 1 show a capacity conservation ratio of 91.7%, 91.7% and 92.4%, respectively. Therefore, it is shown that use of the cathode active material according to Example 1 provides a higher capacity retention as compared to Comparative Examples.

Figure 5:
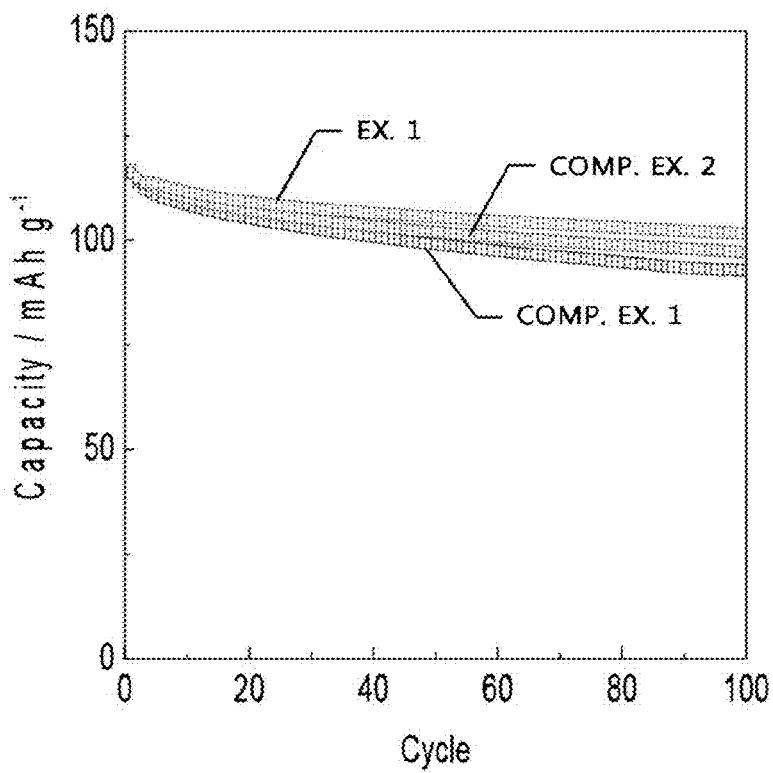
FIG. 5 is a graph illustrating the elevated temperature (60° C.) cycle performance of the half-cells obtained by using the cathode active materials according to the inventive Examples and Comparative Examples.

FIG. 5 is a graph illustrating the cycle performance at the elevated temperature (60° C.) for the half-cells obtained by using the cathode active materials according to Example 1 and Comparative Examples 1 and 2.

As shown in FIG. 5, when carrying out charge/discharge cycles 100 times at a current density of 1 C (theoretical capacity: 148 mAh/g), Comparative Example 1, Comparative Example 2 and Example 1 show a capacity retention of 81.3%, 84.8% and 87.5%, respectively.

Thus, it can be seen from the above results that the presence of a coating layer (Comparative Example 2 and Example 1) provides significantly higher performance as compared to the sample having no coating layer (Comparative Example 1). In addition, Example 1 shows a capacity retention improved as compared to Comparative Example 2 having no fluorine doping. It is thought that fluorine doping at the oxygen sites of lithium aluminum manganese oxide in the coating layer provides a lithium secondary battery with improved performance during charge/discharge cycles at elevated temperature.

Figure 6:
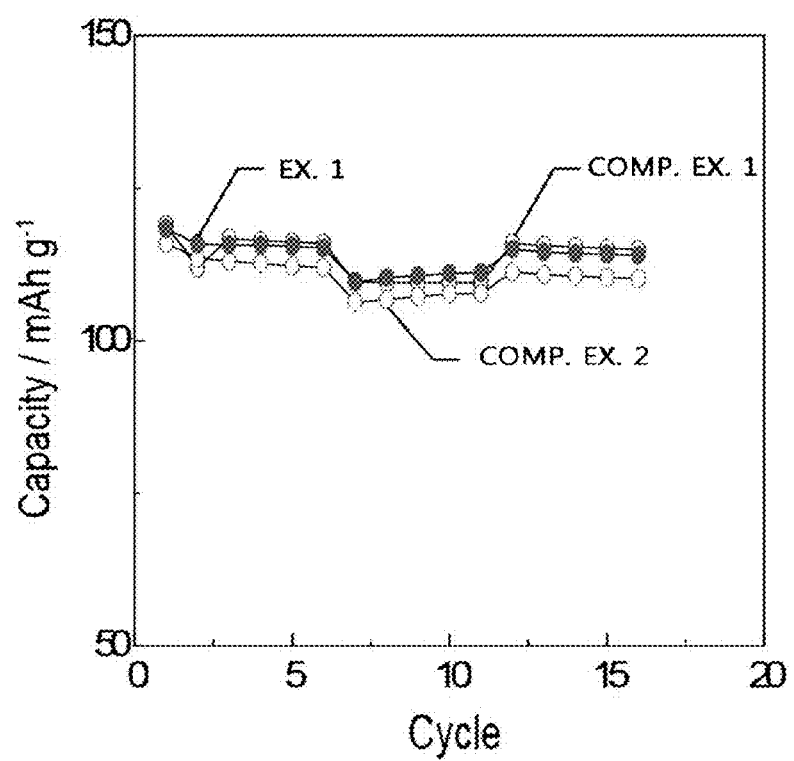
FIG. 6 is a graph illustrating the high rate (1 C vs. 7 C) charge/discharge characteristics (at room temperature) of the half-cells obtained by using the cathode active materials according to the inventive Examples and Comparative Examples.

FIG. 6 is a graph illustrating the high rate (1 C vs. 7 C) charge/discharge characteristics (at room temperature) of the half-cells obtained by using the cathode active materials according to Example 1 and Comparative Examples 1 and 2.

As shown in FIG. 6, after determining the capacity ratio at a current density of 7 C and 1 C, Comparative Example 1 having no surface coating layer shows 94%, Comparative Example 2 having a 2% LiAlMnO$_4$ coating layer shows 94%, and Example 1 having a fluorine-doped 2% LiAlMnO$_4$ coating layer shows 95%. Thus, it can be seen that the presence of a fluorine-doped spinel-structured lithium manganese oxide coating layer provides a lithium secondary battery with improved high-rate discharge characteristics.

What is claimed is:

1. A cathode active material having a core-shell structure, wherein the shell is a coating layer of fluorine-doped spinel-structured lithium metal manganese oxide represented by the following Chemical Formula 1:

$$Li_1M_xMn_{2-x}O_{4-n}F_n \qquad \text{[Chemical Formula 1]}$$

wherein x is 1/(4−z), z is an oxidation number of M, and n is a real number satisfying 0<n<0.3;

wherein M is a metal selected from the group consisting of Al, B, Ga, Mg, Ca, Zn, Ni, Li and a combination thereof;

wherein the core is a spinel-structured lithium manganese oxide (LMO); and wherein the coating layer of fluorine-doped spinel-structured lithium metal manganese oxide has a thickness of 1 nm-1 μm.

2. The cathode active material according to claim 1, wherein the coating layer of fluorine-doped spinel-structured lithium metal manganese oxide and the core are used at a weight ratio of 1:20-200.

3. A positive electrode for a lithium ion secondary battery, the positive electrode comprising the cathode active material as defined in claim 1.

4. A lithium secondary battery comprising the cathode active material as defined in claim 1.

* * * * *